US009898222B2

(12) United States Patent
Niell

(10) Patent No.: US 9,898,222 B2
(45) Date of Patent: Feb. 20, 2018

(54) SOC FABRIC EXTENSIONS FOR CONFIGURABLE MEMORY MAPS THROUGH MEMORY RANGE SCREENS AND SELECTABLE ADDRESS FLATTENING

(71) Applicant: Intel IP Corporation, Santa Clara, CA (US)

(72) Inventor: Jose S. Niell, Franklin, MA (US)

(73) Assignee: Intel IP Corporation, Santa Clara, CA (US)

( * ) Notice: Subject to any disclaimer, the term of this patent is extended or adjusted under 35 U.S.C. 154(b) by 56 days.

(21) Appl. No.: 14/998,224

(22) Filed: Dec. 24, 2015

(65) Prior Publication Data

US 2017/0185346 A1 Jun. 29, 2017

(51) Int. Cl.
*G06F 3/06* (2006.01)
(52) U.S. Cl.
CPC .......... *G06F 3/0644* (2013.01); *G06F 3/0604* (2013.01); *G06F 3/0673* (2013.01)
(58) Field of Classification Search
CPC .... G06F 3/0644; G06F 3/0604; G06F 3/0673; G06F 3/06
USPC .................................................. 711/105, 106
See application file for complete search history.

(56) References Cited

U.S. PATENT DOCUMENTS

| 8,296,386 | B1 * | 10/2012 | Micalizzi, Jr. ...... G06F 11/1004 370/254 |
|---|---|---|---|
| 9,026,735 | B1 | 5/2015 | Torok |
| 9,557,918 | B2 * | 1/2017 | Gair, Jr. ................ G06F 3/0604 |
| 2006/0195649 | A1 | 8/2006 | Bayt |
| 2009/0006718 | A1 | 1/2009 | Blumrich et al. |
| 2010/0077193 | A1 | 3/2010 | Kim et al. |
| 2014/0229656 | A1 | 8/2014 | Goss et al. |
| 2015/0172252 | A1 * | 6/2015 | Pandian ................ H04L 43/045 709/223 |
| 2016/0028728 | A1 * | 1/2016 | Hampel .............. H04L 63/0876 713/156 |

OTHER PUBLICATIONS

International Search Report and Written Opinion for International Application No. PCT/US2016/063165, dated Mar. 7, 2017, 10 pages.

* cited by examiner

*Primary Examiner* — Pierre-Michel Bataille
(74) *Attorney, Agent, or Firm* — Green, Howard & Mughal LLP

(57) ABSTRACT

Described are various SoC fabric extensions for configurable memory mapping. A memory request datapath may transmit a memory request. A first circuitry may identify any memory request having an address between a base-address and limit-address. A second circuitry may transmit to a memory interface any memory request that is identified by the first circuitry, and to apply a default memory access protocol to any memory request that is unidentified by the first circuitry. A third circuitry may modify an address of a memory request when both a multiple-memory-interface indicator and an address-flattening indicator are asserted.

20 Claims, 10 Drawing Sheets

PC legacy Memory Map

2 Memory Interfaces
with tightly-coupled memory subsystem
using Address Flattening

SOC FABRIC EXTENSIONS FOR CONFIGURABLE MEMORY MAPS THROUGH MEMORY RANGE SCREENS AND SELECTABLE ADDRESS FLATTENING

BACKGROUND

A memory map in a computer system may partition different ranges of the system's memory based on a number of factors such as the intended purpose for the various ranges, the type of memory for each range, and the system components that may access or use the various ranges of memory. A memory map may also imply access protocols for the various ranges of memory in order to ensure that all system elements properly interact with memory resources. For example, the memory map for Intel®-based personal computer (PC) systems evolved to accommodate new technologies and methodologies incorporated into system architectures while retaining backward-compatibility with previous system architectures. In order to be compatible with existing PC systems, new system architectures should account for such "legacy" PC memory maps. (Intel is a trademark of Intel Corporation in the U.S. and/or other countries.)

Meanwhile, for flexibility in view of factors such as cost and development time, component designs have increasingly come to embrace SoC (System-on-a-Chip) design methodologies. Some SoC components may be designed to incorporate IP (Intellectual Property) cores, as well as fabrics interconnecting the IP cores, for purposes of flexibility.

Some SoC fabric development has supported the legacy PC system memory map, and as a result the architecture of such systems may be tightly coupled with memory subsystems. However, that tight coupling may interfere with flexibility in SoC system architecture.

BRIEF DESCRIPTION OF THE DRAWINGS

The embodiments of the disclosure will be understood more fully from the detailed description given below and from the accompanying drawings of various embodiments of the disclosure. However, while the drawings are to aid in explanation and understanding, they are only an aid, and should not be taken to limit the disclosure to the specific embodiments depicted therein.

DETAILED DESCRIPTION

Figure 1:
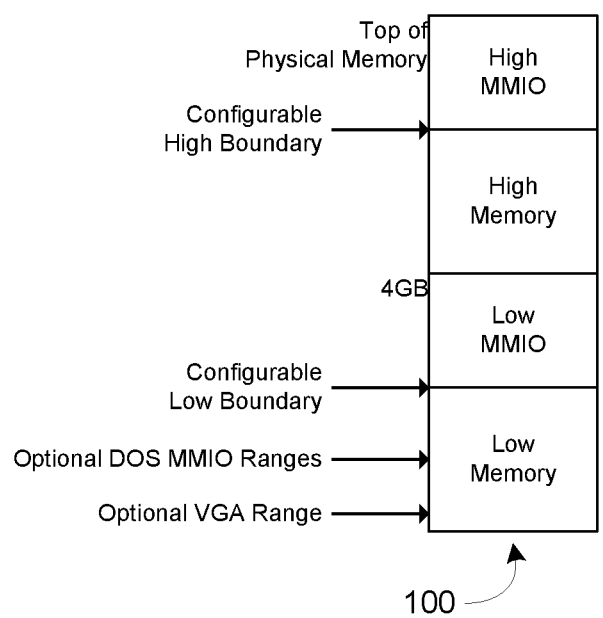
FIG. 1 illustrates an embodiment of a legacy PC memory map.

Some previous SoC fabrics have been designed to support a legacy PC memory map. FIG. 1 illustrates an embodiment of a legacy PC memory map. As illustrated, a memory map 100 includes a Low Memory address range between 0 and a Configurable Low Boundary, a Low Memory-Mapped Input/Output (MMIO) address range between the Configurable Low Boundary and 4 gigabytes (GB), a High Memory address range between 4 GB and a Configurable High Boundary, and a High MMIO address range between the Configurable High Boundary and the Top of Physical Memory. The Low Memory address range may optionally include a Video Graphics Array (VGA) address range (which may span addresses from 0xA_0000 to 0xB_FFFF) and/or one or more Disk Operating System (DOS) MMIO address ranges (which may span addresses from 0xF_0000 to 0xF_FFFF, or from 0xE_0000 to 0xE_FFFF).

Memory accesses to Dynamic Random-Access Memory (DRAM) may have much higher latencies than accesses to local memory, and may therefore impact system performance. In systems with multiple memory interfaces, however, the latency of a memory access on one memory interface may "hide" at least part of the latency of a memory access on another memory interface. If multiple memory accesses could be performed in parallel, it may be possible to increase system performance. In theory, this may increase memory access bandwidth by up to a factor of two.

Figure 2:
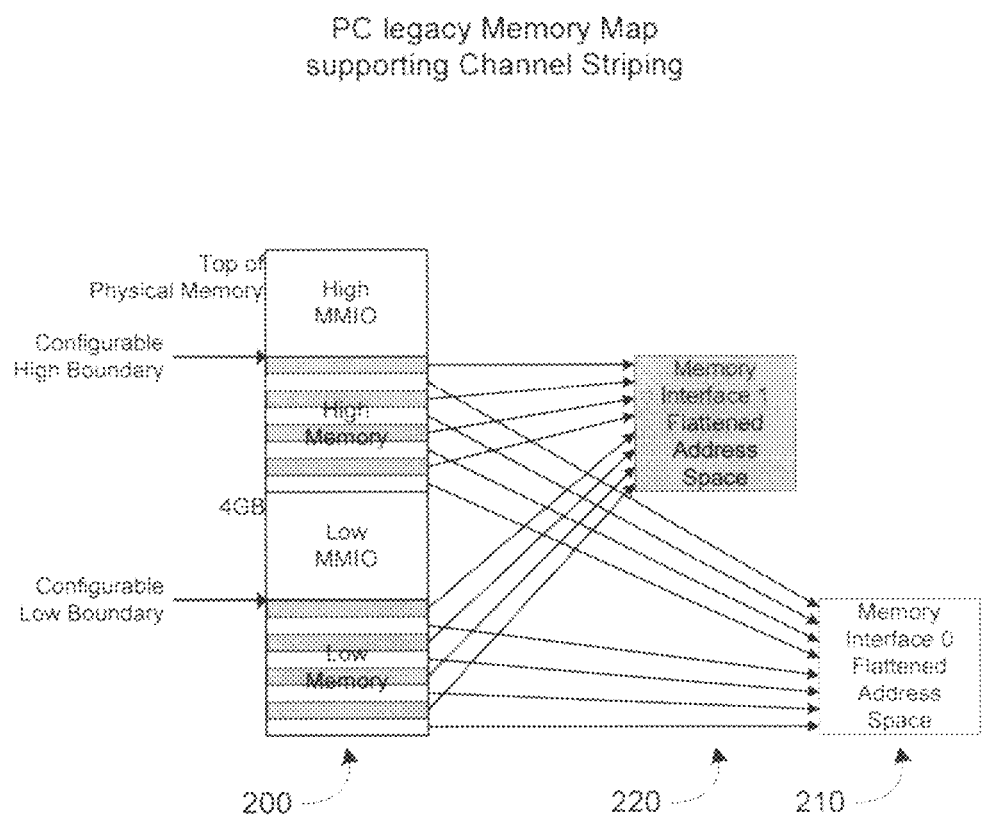
FIG. 2 illustrates an embodiment of a tightly-coupled legacy PC memory map with two memory interfaces and flattened address space.

In order to take advantage of such potential performance gains, other previous SoC fabrics have been designed to a legacy PC memory map while using multi-channel memory striping. FIG. 2 illustrates an embodiment of a tightly-coupled legacy PC memory map with two memory interfaces and flattened address space. As with memory map 100, a memory map 200 includes a Low Memory address range between 0 and a Configurable Low Boundary, a Low MMIO address range between the Configurable Low Boundary and 4 GB, a High Memory address range between 4 GB and a Configurable High Boundary, and a High MMIO address range between the Configurable High Boundary and the Top of Physical Memory.

Unlike memory map 100, however, the Low Memory and High Memory address ranges of memory map 200 are striped, and memory accesses to those address ranges are alternatingly mapped to two memory interfaces. More particularly, some accesses to addresses within memory map 200 may be mapped to a first memory interface 210 (e.g. "Memory Interface 0"), while other accesses may be mapped to a second memory interface 220 (e.g. "Memory Interface 1"). Selection of the memory interface may be based on Physical Address bit[6] being XORed with 0 or more Physical Address bits. In some embodiments, striping may map alternating 64-byte portions of memory to two different memory interfaces (although in other embodiments, alternating 32-byte portions may be mapped, or alternating portions of another size). Although depicted as supporting two memory interfaces, in other embodiments, memory map 200 may support more than two memory interfaces. Similarly, striping may support more than two memory interfaces.

A disadvantage of memory map 200 is that the memory subsystem may become tightly coupled to the fabric, and other (non-fabric) Masters may not be allowed to access the memory subsystem independently. For example, the address spaces of first memory interface 210 and second memory interface 220 are "flattened," so that non-contiguous addresses in the memory map may be mapped to a range of contiguous addresses in the physical memory devices being accessed through first memory interface 210 and second memory interface 220. However, if this flattening is not implemented in an SoC's memory subsystem, then other Masters having access to the subsystem would not perceive the same mapping between memory addresses and memory subsystem targets that the fabric Masters perceive.

Discussed below are various SoC fabric extensions for configurable memory mapping. These extensions may advantageously enhance the flexibility of SoC system architecture, and may accordingly enable a wider array of memory maps and memory system topologies. For example, these extensions may enhance the ability to increase the number of memory interfaces on the fabric to increase bandwidth, and may allow non-fabric Masters connected directly to the memory subsystem to perceive the same mapping between memory addresses and memory subsystem targets as fabric Masters. These extensions may also accommodate memory maps that differ from legacy PC memory maps.

In the following description, numerous details are discussed to provide a more thorough explanation of embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct electrical, mechanical, or magnetic connection between the things that are connected, without any intermediary devices. The term "coupled" means either a direct electrical, mechanical, or magnetic connection between the things that are connected or an indirect connection through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The terms "substantially," "close," "approximately," "near," and "about" generally refer to being within +/−10% of a target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking, or in any other manner.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

Figure 3:
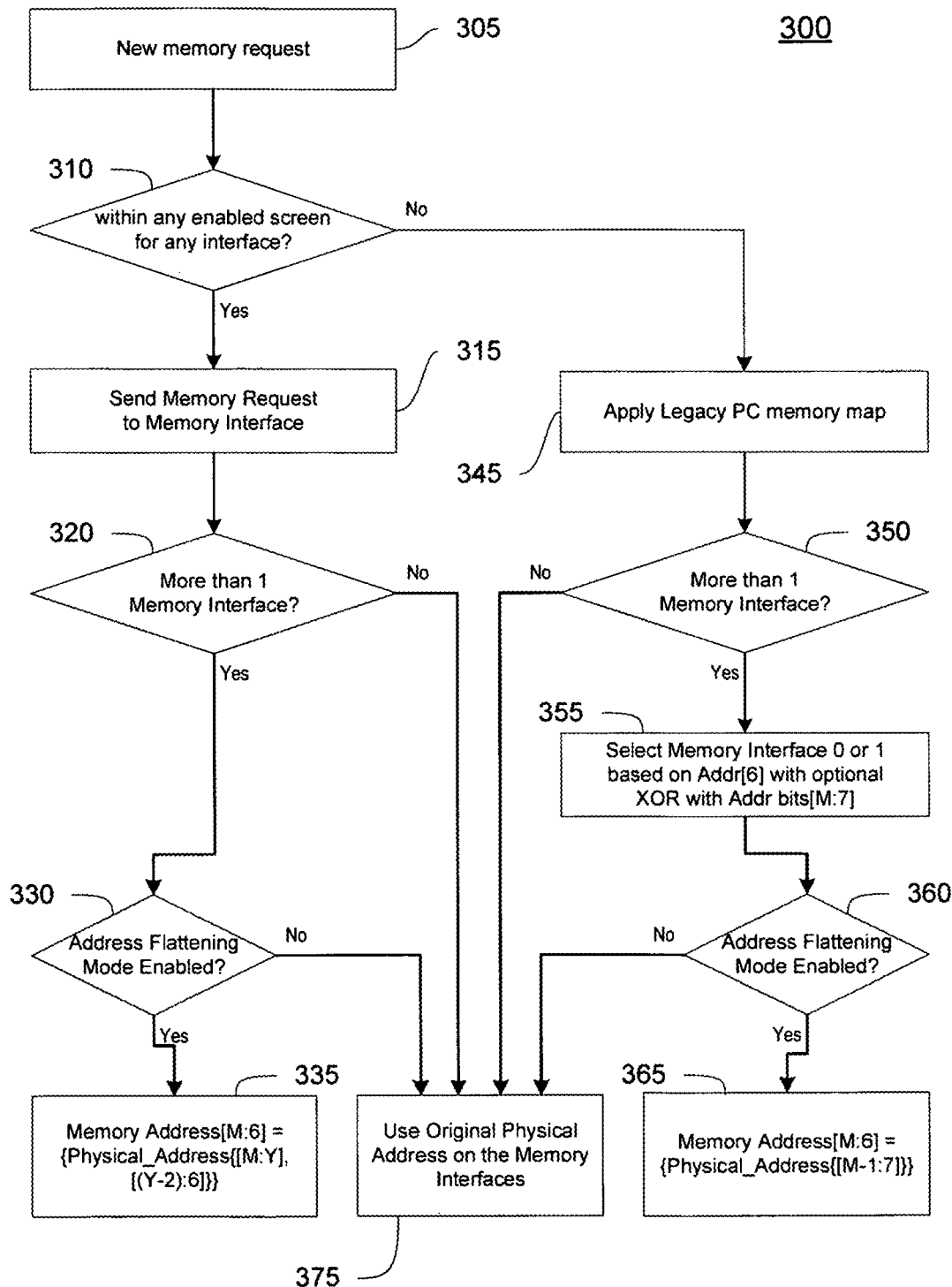
FIG. 3 illustrates an embodiment of an algorithm for a fabric to process memory requests.

FIG. 3 illustrates an embodiment of an algorithm for a fabric to process memory requests. At a first point 305 of an algorithm 300, a new memory request arrives at the fabric. Upon receiving the new memory request, at point 310 in the algorithm, the address of the new memory request is compared to various configuration registers to determine whether the address of the memory request is within a range of physical addresses being screened. (This comparison occurs before any legacy PC memory mapping.)

Figure 4:
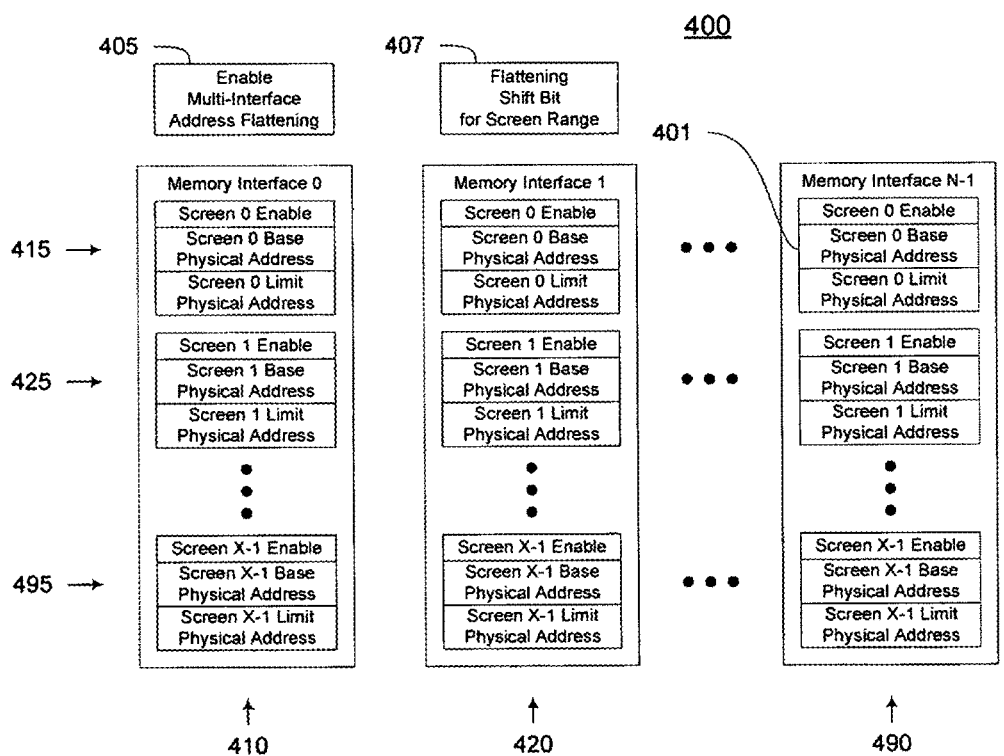
FIG. 4 illustrates an embodiment of configuration registers for a fabric.

Turning briefly away from this illustration, FIG. 4 illustrates an embodiment of configuration registers for a fabric. A set of configuration registers 400 includes sets of screening registers 401 defined for one or more screens associated with each of one or more memory interfaces. Configuration registers 400 may be configurable by firmware or Basic Input/Output System (BIOS), and may have pre-initialized values after initial power-on of the fabric.

More particularly, as illustrated, configuration registers 400 may be partitioned among a first memory interface 410 ("Memory Interface 0"), a second memory interface 420 ("Memory Interface 1"), and a last memory interface 490 ("Memory Interface N−1," out of a total of N memory interfaces). Each of these memory interfaces may include a set of screening registers 401 defined for a first screen 415 ("Screen 0"), a second screen 425 ("Screen 1"), and a last screen 495 ("Screen X−1," out of a total of X screens). Each set of screening registers 401 includes three registers for the corresponding screen of the corresponding interface: a Screen Enable, a Base Physical Address, and a Limit Physical Address.

Configuration registers 400 also include a flattening enable register 405 and a flattening shift bit for screen range register 407, which may be operable for all memory interfaces. (These registers will be discussed further below.)

Returning to FIG. 3, in determining whether the address of the memory request is within a range of physical addresses being screened (at point 310), the fabric may check the sets of screening registers 401 for all screens and for all memory interfaces. More particularly, for all sets of screening registers 401 in which the Screen Enable bit set, the fabric may evaluate the physical address of the new memory request against the Screen Base address and Screen Limit address. If the physical address of the new memory request is both greater than or equal to the Base Physical Address and less than the Limit Physical Address, then the address of the memory request may be determined to be within a range of physical addresses being screened.

For memory requests falling within a screened address range for any memory interface, at point 315, algorithm 300 may route the memory request to the memory interface for which that address ranged is screened. At point 320, algorithm 300 may consider whether there is more than one memory interface; if so, then at point 330, algorithm 300 additionally considers whether address flattening enable register 405 is set. If so, then address bits [M:6] of the memory request may be set to the values of address bits $\{[M:Y],[(Y-2):6]\}$ at point 335. Y may be a number between M and 8 (inclusive) representing a bit position within memory addresses, and may be set by configuring flattening shift bit for screen range register 407. Based on the above discussion, if algorithm 300 determines that address flattening enable register 405 is set, then the address bits [M:6] of the memory request may be set to exclude address bit Y−1 of the memory request as configured by flattening shift bit for screen range register 407, where M>=Y>=8 (which may reflect the screen moving to preserve a contiguous range).

For memory requests not falling within any screened address range for any memory interface, algorithm 300 may apply a legacy PC memory map to the memory request at point 345. In various embodiments, the application of a legacy PC memory map may result in routing the memory request to Memory Interface 0 or Memory Interface 1 to suit a legacy striping or hashing protocol. At point 350, algorithm 300 may consider whether there is more than memory interface. If so, then at point 355, algorithm 300 may select to route the memory request to Memory Interface 0 or Memory Interface 1 based on address bit [6], with an optional XOR with address bits [M:7]. At point 360, algorithm 300 may consider whether address flattening enable register 405 is set. If so, then address bits [M:6] of the memory request may be set to the values of address bits {[M−1:7]} at point 365.

In accordance with algorithm 300, for all memory requests—whether or not they fall within a screened address range for any memory interface—if multiple memory interfaces are not present, or if multi-interface address flattening enable register 405 is not set, then at point 375 the memory request may use the original physical address on the memory interfaces. In other words, if only one memory interface is available, or if flattening is not enabled, original physical addresses may be preserved.

Algorithm 300 may permit the identification of "screened" memory ranges not subjected to a legacy PC memory map. As a result, such accesses may not be subject to a legacy striping or hashing protocol. Algorithm 300 may accordingly provide a mechanism to specify memory ranges that may not be subject to a striping or hashing protocol. Algorithm 300 may therefore advantageously be used to disable striping or hashing for one or more memory ranges, for example, or to specify memory ranges that may be mapped to various memory interfaces without striping or hashing.

In addition, algorithm 300 may permit the identification of particular memory ranges with particular memory channels. In other words, a variety of memory ranges may be indicated for each memory interface in the system, and algorithm 300 may direct memory accesses to those memory ranges to the corresponding memory interfaces.

Algorithm 300 may also provide a mechanism to disable address flattening. In systems with address flattening disabled, fabric Masters and non-fabric Masters may have matching perceptions of system memory. This may advantageously permit simpler architecture for an SoC memory subsystem capable of serving non-fabric Masters, since the memory subsystem may not need to take into account potentially differing perceptions of system memory between the fabric Masters and the non-fabric Masters. Accounting for those potentially differing perceptions in the memory subsystem may be complex, and may impose both system costs and development costs.

Based on the discussion above, algorithm 300 may advantageously provide flexibility to support a variety of system memory maps and system topologies.

Figure 5:
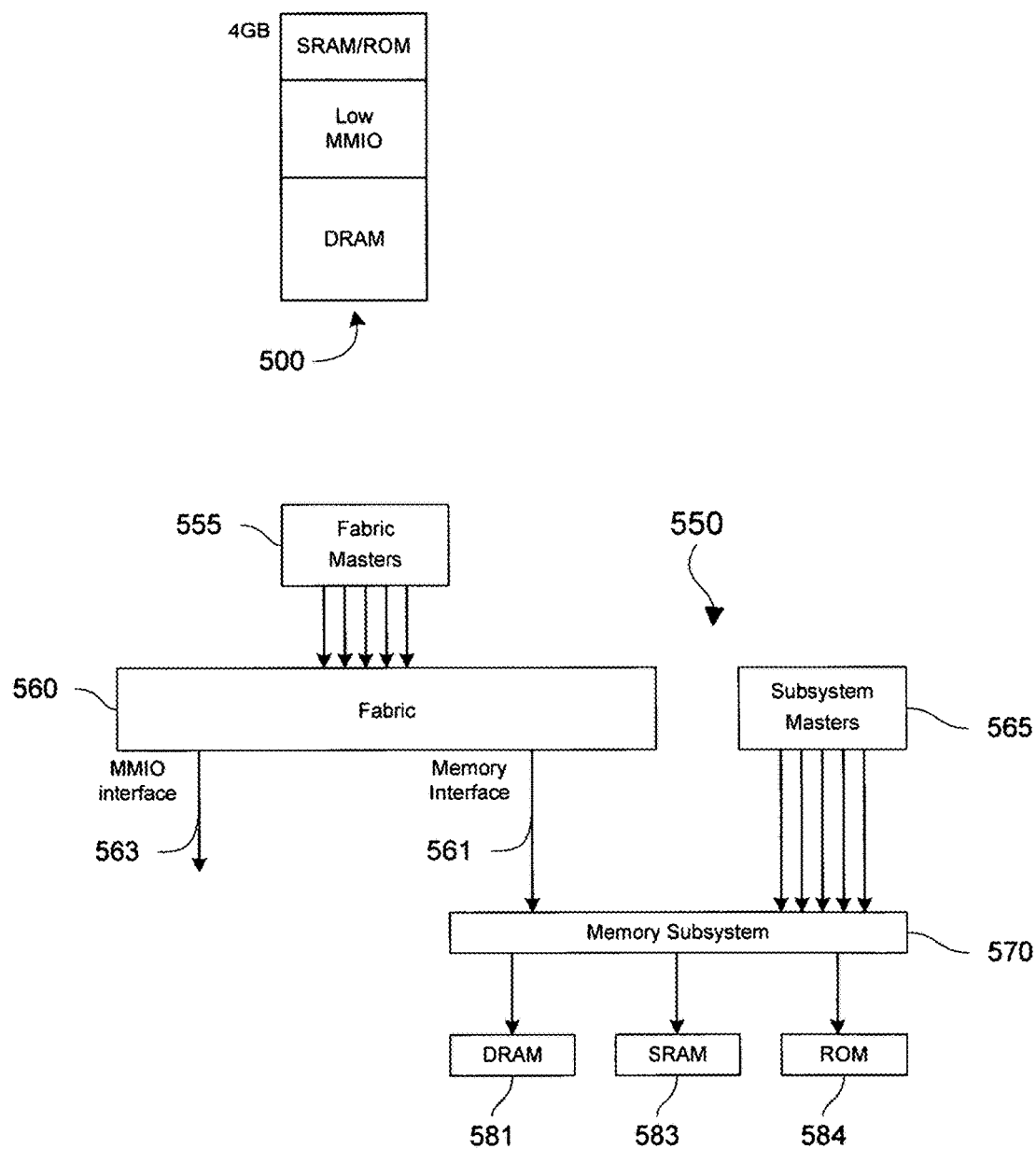
FIGS. 5-7 illustrate embodiments of SoC memory maps and corresponding SoC memory architectures incorporating a fabric to process memory requests.
Figure 6:
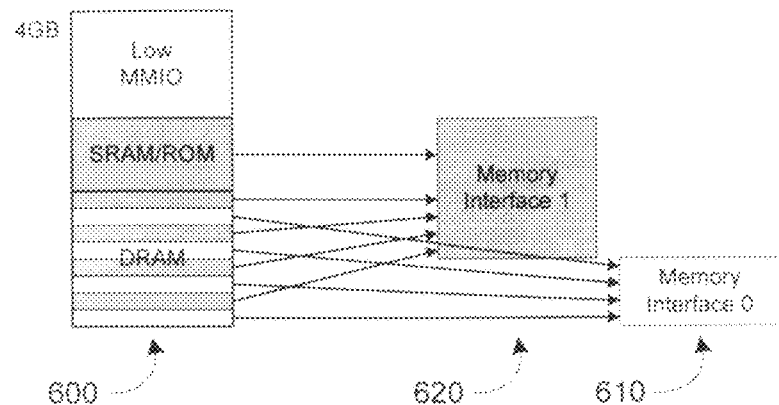
Figure 6:
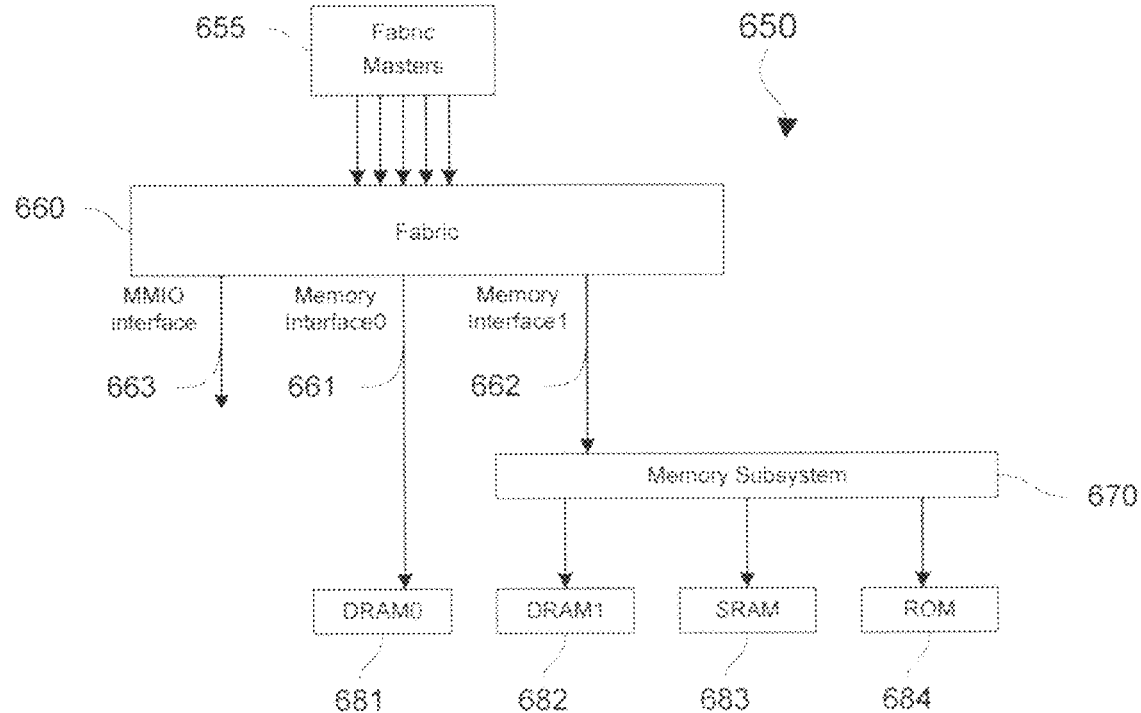
Figure 7:
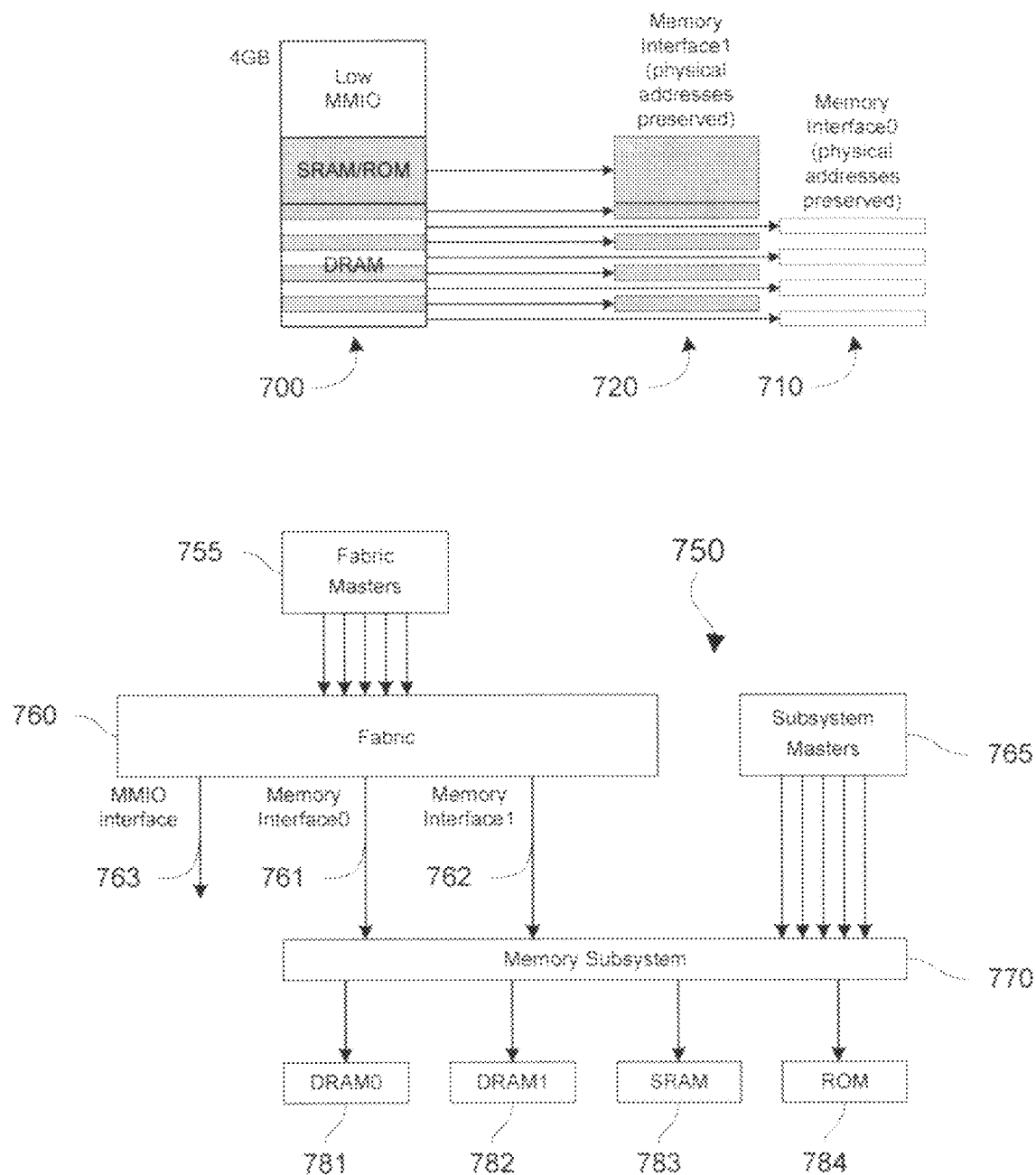

FIGS. 5-7 illustrate embodiments of SoC memory maps and corresponding SoC memory architectures incorporating a fabric to process memory requests. FIG. 5 depicts a scenario with one memory interface and independent memory subsystems. In FIG. 5, a memory map 500 includes a DRAM range, a Low MMIO range, and an Static Random Access Memory (SRAM)/Read-Only memory (ROM) range, all extending between 0 and 4 GB.

Corresponding SoC memory architecture 550 includes one or more fabric masters 555, one or more subsystem masters 565 (e.g., non-fabric Masters), a fabric 560, a memory interface 561, an MMIO interface 563, a memory subsystem 570, and various memory subsystem targets such as a DRAM 581, an SRAM 583, and a ROM 584.

Fabric masters 555 may transmit memory requests to fabric 560, which may then transmit the requests either to MMIO interface 563, or through memory interface 561 to memory subsystem 570. Subsystem masters 565 may transmit memory requests directly to memory subsystem 570. In turn, memory requests received by memory subsystem 570 may then be routed to DRAM 581, SRAM 583, or ROM 584 as appropriate.

Fabric 560 may employ algorithm 300 as above. New memory requests to fabric 560 with addresses falling within an enabled screen for a memory interface may be sent to memory interface 561, while a legacy PC memory map may be applied for other memory requests. However, since memory architecture 550 does not include more than one memory interface, algorithm 300 may leave memory address bits [M:6] of the memory requests unaltered.

In this embodiment, subsystem masters 565 may independently access memory subsystem 570, and may advantageously perceive the same mapping between memory addresses and memory subsystem targets such as DRAM 581, SRAM 583, or ROM 584 that the fabric masters 555 perceive. Fabric 560 and Memory subsystem 570 may accordingly operate to ensure that fabric masters 555 and subsystem masters 565 perceive the same mapping between memory addresses and the various memory subsystem targets (as in memory map 500).

FIG. 6 depicts a scenario with two memory interfaces with a tightly-coupled memory subsystem using address flattening. In FIG. 6, a memory map 600 includes a DRAM range, an SRAM/ROM range, and a Low MMIO range, all extending between 0 and 4 GB. The DRAM range of memory map 600 is striped, and some memory accesses to that address range may be alternatingly mapped to a first memory interface 610 ("Memory Interface 0") and a second memory interface 620 ("Memory Interface 1"). The SRAM/ROM range may also be mapped to second memory interface 620. In addition, address spaces of first memory interface 610 and second memory interface 620 may be flattened (e.g. by setting flattening enable register 405).

Corresponding SoC memory architecture 650 includes one or more fabric masters 655, a fabric 660, a first memory interface 661 ("Memory Interface 0"), a second memory interface 662 ("Memory Interface 1"), an MMIO interface 663, a memory subsystem 670, and various memory subsystem targets such as a first DRAM 681 ("DRAM 0"), a second DRAM 682 ("DRAM 1"), an SRAM 683, and a ROM 684.

Fabric masters 655 may transmit memory requests to fabric 660, which may then transmit the requests either to MMIO interface 663, or through first memory interface 661 to first DRAM 681, or through second memory interface 662 to memory subsystem 670. In turn, memory requests received by memory subsystem 670 may then be routed to second DRAM 682, SRAM 683, or ROM 684.

Fabric 660 may employ algorithm 300 as discussed above. New memory requests to fabric 660 with addresses falling within an enabled address screen for either first memory interface 661 or second memory interface 662 may be sent to the corresponding memory interface, while a legacy PC memory map may be applied for other memory requests. In various embodiments, algorithm 300 may make a selection between first memory interface 661 or second memory interface 662 to suit a legacy striping or hashing protocol. Since memory architecture 650 includes more than one memory interface, and since address flattening is enabled, algorithm 300 may adjust memory address bits [M:6] of the memory requests. In addition, for memory requests not having addresses falling within an enabled address screen for either first memory interface 661 or second memory interface 662 (e.g. memory accesses for which a legacy PC memory map may be applied), algorithm 300 may select first memory interface 661 or second memory interface 662 based on address bit [6], with an optional XOR with address bits [M:7].

Some systems supporting flattened memory maps with screens and striping may benefit from ensuring that the boundary addresses of the screened regions are naturally aligned to powers of two. For example, a user may configure a value of Y in the flattening shift bit for screen range register 407 to determine which address bit should be excised from screened memory addresses, and algorithm 300 may then at point 335 set address bits [M:6] of the memory request to the values of address bits {[M:Y],[(Y−2):6] }

While address flattening may be enabled for some SoC topologies with tightly-coupled memory subsystems (such as in memory map 600 and corresponding SoC architecture 650), it may be disabled for other SoC topologies with independent memory subsystems having two or more memory interfaces. FIG. 7 depicts a scenario with two memory interfaces with an independent memory subsystem and address flattening disabled. In FIG. 7, a memory map 700 includes a DRAM range, an SRAM/ROM range, and a Low MMIO range, all extending between 0 and 4 GB. The DRAM range of memory map 700 is striped, and some memory accesses to that address range may be alternatingly mapped to a first memory interface 710 ("Memory Interface 0") and a second memory interface 720 ("Memory Interface 1"). The SRAM/ROM range may also be mapped to second memory interface 720. Unlike memory map 600, however, address spaces of first memory interface 710 and second memory interface may remain not flattened, and may instead preserve their (non-contiguous) physical addresses (e.g. by clearing flattening enable register 405).

Corresponding SoC memory architecture 750 includes one or more fabric masters 755, a fabric 760, a first memory interface 761 ("Memory Interface 0"), a second memory interface 762 ("Memory Interface 1"), an MMIO interface 763, one or more subsystem masters 765 (e.g., non-fabric Masters), a memory subsystem 770, and various memory subsystem targets such as a first DRAM 781 ("DRAM 0"), a second DRAM 782 ("DRAM 1"), an SRAM 783, and a ROM 784.

Fabric masters 755 may transmit memory requests to fabric 760, which may then transmit the requests either to first memory interface 761, second memory interface 762, or MMIO interface 763. Subsystem masters 765 may transmit memory requests directly to memory subsystem 770. In turn, memory requests received by memory subsystem 770 may then be routed to first DRAM 781, second DRAM 782, SRAM 783, or ROM 784.

Fabric 760 may employ algorithm 300 as discussed above. New memory requests to fabric 760 with addresses falling within an enabled screen for either first memory interface 761 or second memory interface 762 may be sent to the corresponding memory interface, while a legacy PC memory map may be applied for other memory requests. In various embodiments, algorithm 300 may make a selection between first memory interface 761 or second memory interface 762 to suit a legacy striping or hashing protocol. Since memory architecture 750 includes more than one memory interface, but since address flattening is disabled, algorithm 300 may leave memory address bits [M:6] of the memory requests unaltered. However, for memory requests not having addresses falling within an enabled address screen for either first memory interface 761 or second memory interface 762 (e.g. memory accesses for which a legacy PC memory map may be applied), algorithm 300 may select first memory interface 761 or second memory interface 762 based on address bit [6], with an optional XOR with address bits [M:7].

Memory subsystem 770 may accept memory access requests from both first memory interface 761 and second memory interface 762 and handle them in parallel to first DRAM 781 and second DRAM 782 (either to deliver data to memory or return data from memory). The ability to disable address flattening while supporting first memory interface 761 and second memory interface 762 may allow memory map 700 and memory architecture 750 to preserve physical addresses through memory subsystem 770. In turn, subsystem masters 765 may advantageously perceive the same mapping between memory addresses and memory subsystem targets that fabric masters 755 perceive (which would not have been possible without the ability to disable address flattening). Fabric 760 and Memory subsystem 770 may accordingly operate to ensure that fabric masters 755 and subsystem masters 765 perceive the same mapping between memory addresses and the various memory subsystem targets (as in memory map 700).

Figure 8:
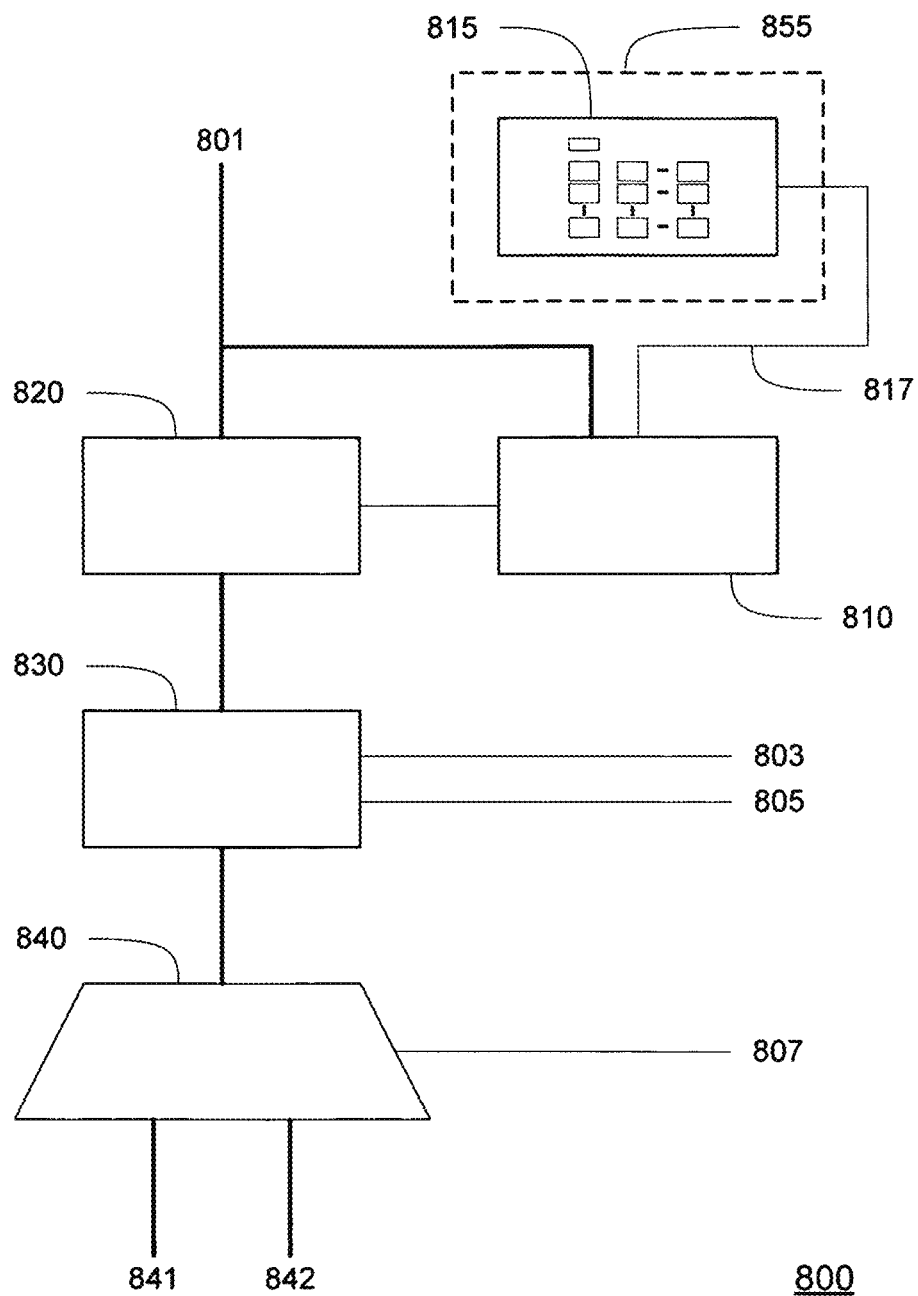
FIG. 8 illustrates an embodiment of a portion of a fabric implementing an algorithm for processing memory requests.

FIG. 8 illustrates an embodiment of a portion of a fabric implementing an algorithm for processing memory requests. In some embodiments, fabric portion 800 may comprise a memory request datapath 801 operable to transmit memory requests, a first circuitry 810 operable to identify memory requests, a second circuitry 820 operable to transmit or apply memory access protocols to memory requests, a third circuit 830 operable to modify addresses of memory requests, a multiple-memory-interface indicator 803, an address-flattening indicator 805, and a memory interface 841.

More particularly, first circuitry 810 may be operable to identify any memory request having an address that is between any of one or more pairs of base-address and limit-address indicators. For example, first circuitry 810 may compare addresses of memory requests as in algorithm 300.

Some embodiments of fabric portion 800 may comprise pairs of base-address and limit-address registers 815 that respectively drive the pairs of base-address and limit-address indicators through a register bus 817. For example, pairs of base-address and limit-address registers 815 may be Base Physical Address and Limit Physical Address registers of screening registers 401. In some embodiments, at least one of the pairs of base-address and limit-address indicators may have a corresponding screen-enable register driving a screen-enable indicator. For example, the screen-enable register may be a Screen Enable register of screening registers 401. In some such embodiments, first circuitry 810 may also be operable to identify a memory request when the corresponding screen-enable indicator is asserted. In addition, some embodiments of fabric portion 800 may comprise a plurality of memory interfaces, wherein at least one memory interface of the plurality of memory interfaces has one or more of the pairs of base-address and limit-address indicators.

Second circuitry 820 may be operable to transmit any memory request identified by first circuitry 810 to memory interface 841. Second circuitry 820 may also be operable to apply a default memory access protocol to any memory request that is unidentified by first circuitry 810 (e.g., any memory request not having an address between any of one or more pairs of base-address and limit-address indicators). The default memory protocol may include a legacy PC memory map, for example.

Third circuitry 830 may be operable to modify an address of a memory request when both multiple-memory-interface indicator 803 and address-flattening indicator 805 are asserted. In some embodiments, third circuitry 830 may be operable to set address bits [M:6] of a memory request. If the memory request is identified by first circuitry 810, and if both multiple-memory-interface indicator 803 and address-flattening indicator 805 are asserted, third circuitry 830 may set address bits [M:6] of the memory request to the values of address bits $\{[M:Y],[(Y-2):6]\}$. If the memory request is unidentified by first circuitry 810, and if both multiple-memory-interface indicator 803 and address-flattening indicator 805 are asserted, third circuitry 830 may set address bits [M:6] of the memory request to the values of address bits $\{[M-1:7]\}$. If either multiple-memory-interface indicator 803 or address-flattening indicator 805 is deasserted, third circuitry 830 may leave address bits [M:6] of the memory request unmodified.

Some embodiments of fabric portion 800 may comprise both memory interface 841 and a second memory interface 842. In some such embodiments, fabric portion 800 may comprise a fourth circuitry 840, which may be operable to select second memory interface 842 for a memory request on the memory request datapath based upon an alternate memory interface indicator 807 indicating the use of one of a striping protocol and a hashing protocol.

FIG. 8 also depicts embodiments of fabric portion 800 comprising a memory request datapath 801 operable to transmit a memory request, a first memory interface 841, a second memory interface 842, a first set of logic devices 810 operable to identify memory requests, a configuration circuitry 855, and a second set of logic devices 820 operable to transmit or apply memory access protocols to memory requests.

More particularly, first set of logic devices 810 may be operable to identify any memory request having an address that is between either a screen base address and a screen limit address for any of one or more first screens, or between a screen base address and a screen limit address for any of one or more second screens.

Configuration circuitry 855 may have a first set of memory interface logic devices, including circuitry for the one or more first screens. The circuitry for at least one first screen may include a screen base address register operable to store a screen base address and a screen limit address register operable to store a screen limit address (such as Base Physical Address and Limit Physical Address registers of screening registers 401). Configuration circuitry 855 may also have a second set of memory interface logic devices, including circuitry for the one or more second screens. The circuitry for at least one second screen may include a screen base address register operable to store a screen base address and a screen limit address register operable to store a screen limit address (such as Base Physical Address and Limit Physical Address registers of screening registers 401).

Second set of logic devices 820 may be operable to transmit to either first memory interface 841 or second memory interface 842 any memory requests that are identified by first set of logic devices 810. Second set of logic devices 820 may also be operable to apply a default memory access protocol to any memory requests not identified by first set of logic devices 810.

In some embodiments, the circuitry for at least one first screen and the circuitry for at least one second screen may include a corresponding screen enable register operable to store a screen enable (such as a Screen Enable register of screening registers 401). In some such embodiments, first set of logic devices 810 may be operable to identify any memory request when the corresponding screen enable is asserted.

In some embodiments, fabric portion 800 may comprise an address flattening enable register operable to store an address flattening enable, and may also comprise a third set of logic devices 830 operable to modify an address associated with any memory request when the address flattening enable is asserted. In some such embodiments, third set of logic devices 830 may be operable to set address bits [M:6] of a memory request. If the memory request is identified by first set of logic devices 810, and if both a multiple-memory-interface indicator 803 and an address-flattening indicator 805 are asserted, third set of logic devices 830 may set address bits [M:6] of the memory request to the values of address bits $\{[M:Y],[(Y-2):6]\}$. If the memory request is unidentified by first set of logic devices 810 and both multiple-memory-interface indicator 803 and address-flattening indicator 805 are asserted, third set of logic devices 830 may set address bits [M:6] of the memory request to the values of address bits $\{[M-1:7]\}$. If either multiple-memory-interface indicator 803 or address-flattening indicator 805 is deasserted, third set of logic devices 830 may leave address bits [M:6] of the memory request unmodified.

Some embodiments of fabric portion 800 may comprise a fourth set of logic devices 840, which may be operable to select second memory interface 842 for a memory request on the memory request datapath based upon alternate memory interface indicator 807 indicating the use of one of a striping protocol and a hashing protocol.

Figure 9:
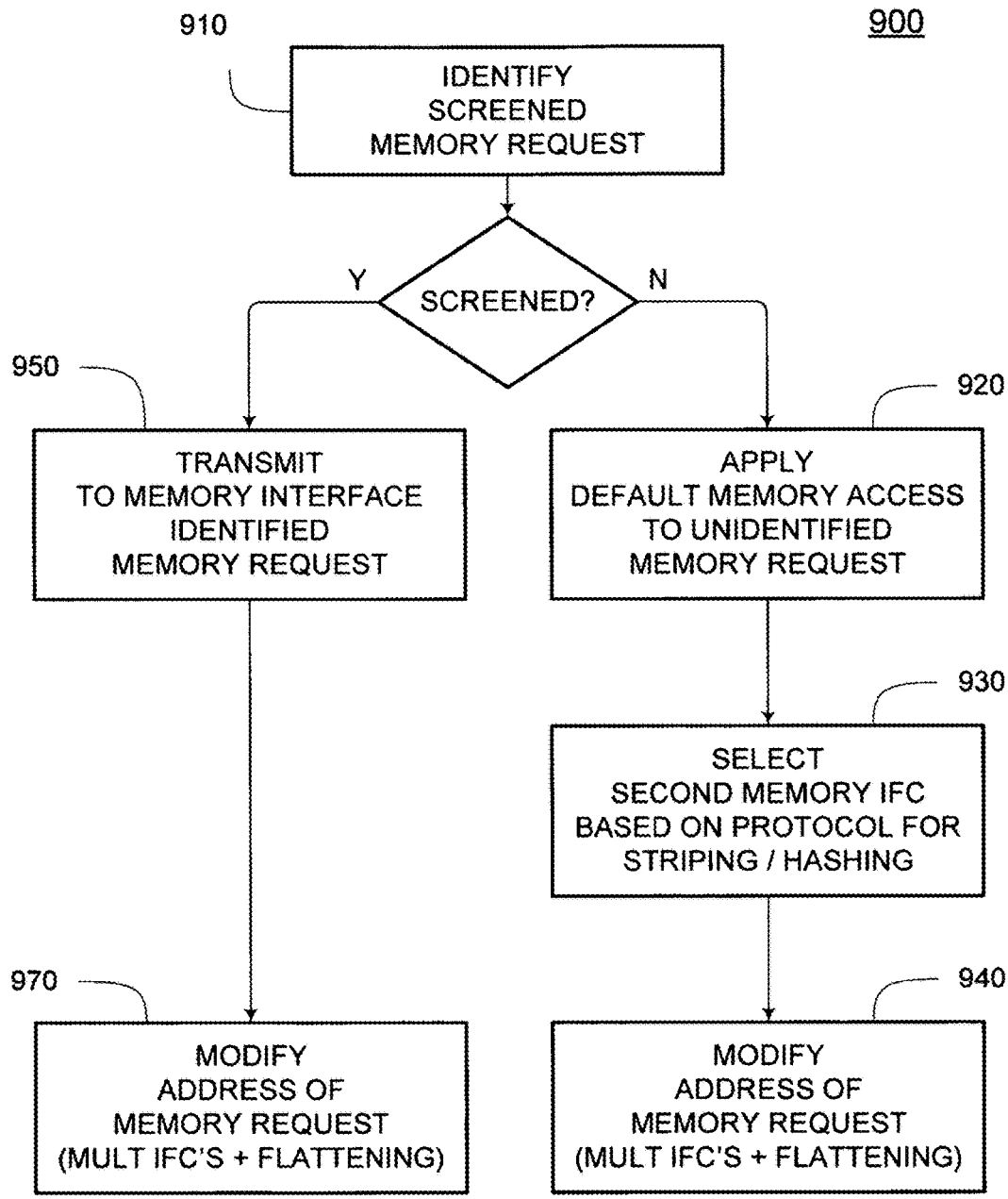
FIG. 9 illustrates an embodiment of a method for fabric to process new memory requests.

FIG. 9 illustrates an embodiment of a method for fabric to process new memory requests. A method 900 may include an identification 910 of a screened memory request, an application 900 of a default memory access protocol, a selection 930 of a second memory interface, a modification 940 of a memory request address, a transmission 950 to a memory interface, and a modification 970 of a memory request address.

More particularly, identification 910 may comprise identifying, with a set of logic devices, any memory request on a memory request datapath having an address that is between any of one or more pairs of base-address and limit-address indicators. Application 920 may comprise applying a default memory access protocol to any memory requests unidentified by the set of logic devices. Transmission 950 may comprise transmitting to a memory interface any memory requests identified by the set of logic devices. Modification 970 may comprise modifying an address of a memory request when multiple memory interfaces are available while an address-flattening indicator is asserted.

Some embodiments of method 900 may comprise an identification, with the set of logic devices, of a memory request when a corresponding screen-enable indicator is asserted. In some embodiments, a first memory interface may have one or more first pairs of base-address and limit-address indicators, and a second memory interface may have one or more second pairs of base-address and limit-address indicators. Some such embodiments of method 900 may comprise a selection of the second memory interface for a memory request on the memory request datapath, based upon one of a striping protocol and a hashing protocol.

Some embodiments of method 900 may comprise a modification of a memory request to set address bits [M:6] of the memory request. If the memory request is identified by the set of logic devices, and if multiple memory interfaces are available and the address-flattening indicator is asserted, address bits [M:6] of the memory request may be set to the values of address bits $\{[M:Y],[(Y-2):6]\}$. If the memory request is unidentified by the set of logic devices, and if multiple memory interfaces are available and the address-flattening indicator is asserted, address bits [M:6] of the memory request may be set to the values of address bits $\{[M-1:7]\}$. If either multiple memory interfaces are not unavailable or the address-flattening indicator is deasserted, address bits [M:6] of the memory request may be left unmodified.

Although the actions in the flowchart with reference to FIG. 9 are shown in a particular order, the order of the actions can be modified. Thus, the illustrated embodiments can be performed in a different order, and some actions may be performed in parallel. Some of the actions and/or operations listed in FIG. 9 are optional in accordance with certain embodiments. The numbering of the actions presented is for the sake of clarity and is not intended to prescribe an order of operations in which the various actions must occur. Additionally, operations from the various flows may be utilized in a variety of combinations.

Moreover, in some embodiments, machine readable storage media may have executable instructions that, when executed, cause a fabric to perform an operation comprising method 900. Similarly, in some embodiments, machine readable storage media may have executable instructions that, when executed, cause the fabric to perform an operation comprising method 900. Such machine readable storage media may include any of a variety of storage media, like magnetic storage media (e.g. magnetic tapes or magnetic disks), optical storage media (e.g. optical discs), electronic storage media (e.g. conventional hard disk drives, solid-state disk drives, or flash-memory-based storage media), or any other tangible storage media or non-transitory storage media.

Figure 10:
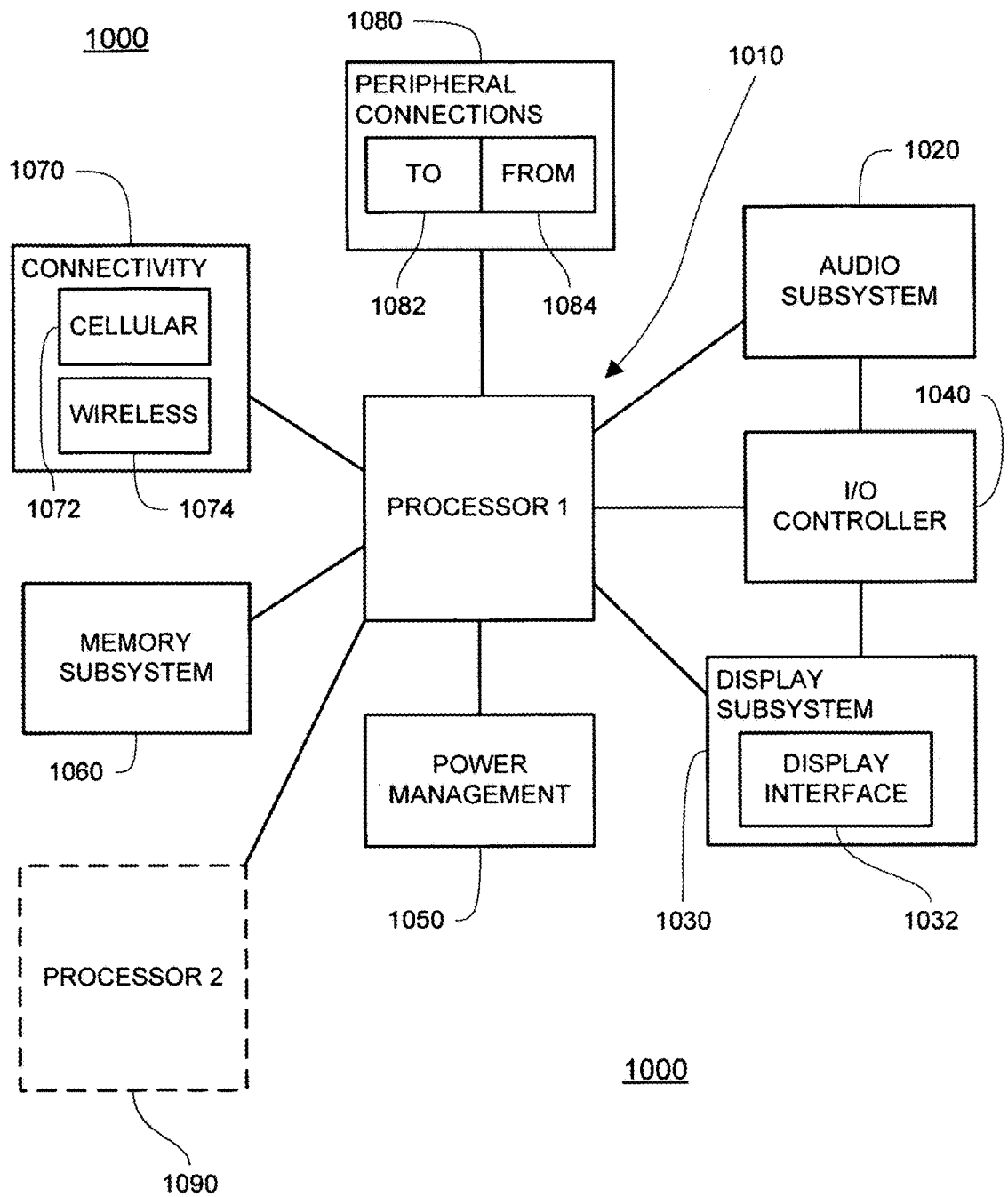
FIG. 10 illustrates a computing device with mechanisms to provide various SoC fabric extensions for configurable memory mapping, according to some embodiments of the disclosure.

FIG. 10 illustrates a computing device with mechanisms to provide various SoC fabric extensions for configurable memory mapping, according to some embodiments of the disclosure.

FIG. 10 illustrates a computing device with mechanisms to provide various SoC fabric extensions for configurable memory mapping, according to some embodiments of the disclosure. It is pointed out that those elements of FIG. 10 having the same reference numbers (or names) as the elements of any other figure can operate or function in any manner similar to that described, but are not limited to such.

Computing device 1000 may be an SoC, a computer system, a workstation, or a server with mechanisms to provide various SoC fabric extensions for configurable memory mapping, according to some embodiments of the disclosure. FIG. 10 illustrates a block diagram of an embodiment of a mobile device which may be operable to use flat surface interface connectors. In one embodiment, computing device 1000 may be a mobile computing device, such as a computing tablet, a mobile phone or smart-phone, a wireless-enabled e-reader, or other wireless mobile device. It will be understood that certain components are shown generally, and not all components of such a device are shown in computing device 1000.

Computing device 1000 includes a first processor 1010 with mechanisms to provide various SoC fabric extensions for configurable memory mapping, according to some embodiments discussed. Other blocks of computing device 1000 may also include the mechanisms to provide various SoC fabric extensions for configurable memory mapping of some embodiments. The various embodiments of the present disclosure may also comprise a network interface within 1070 such as a wireless interface so that a system embodiment may be incorporated into a wireless device, for example a cell phone or personal digital assistant.

In some embodiments, processor 1010 can include one or more physical devices, such as microprocessors, application processors, microcontrollers, programmable logic devices, or other processing means. The processing operations performed by processor 1010 may include the execution of an operating platform or operating system on which applications and/or device functions may then be executed. The processing operations may also include operations related to one or more of the following: I/O (input/output) with a human user or with other devices; power management; connecting computing device 1000 to another device; audio I/O; and/or display I/O.

In some embodiments, computing device 1000 includes an audio subsystem 1020, which represents hardware components (e.g., audio hardware and audio circuits) and software components (e.g., drivers and/or codecs) associated with providing audio functions to computing device 1000. Audio functions can include speaker and/or headphone output as well as microphone input. Devices for such functions can be integrated into computing device 1000, or connected to computing device 1000. In one embodiment, a user interacts with computing device 1000 by providing audio commands that are received and processed by processor 1010.

In some embodiments, computing device 1000 includes a display subsystem 1030, which represents hardware components (e.g., display devices) and software components (e.g., drivers) that provide a visual and/or tactile display for a user to interact with computing device 1000. Display subsystem 1030 may include a display interface 1032, which may be a particular screen or hardware device used to provide a display to a user. In one embodiment, display interface 1032 includes logic separate from processor 1010 to perform at least some processing related to the display. In some embodiments, display subsystem 1030 includes a touch screen (or touch pad) device that provides both output and input to a user.

In some embodiments, computing device 1000 includes an I/O controller 1040 associated with hardware devices and software components related to interaction with a user. I/O controller 1040 is operable to manage hardware that is part of audio subsystem 1020 and/or display subsystem 1030. Additionally, I/O controller 1040 may be a connection point for additional devices that connect to computing device 1000, through which a user might interact with the system. For example, devices that can be attached to computing device 1000 might include microphone devices, speaker or stereo systems, video systems or other display devices, keyboard or keypad devices, or other I/O devices for use with specific applications such as card readers or other devices.

As mentioned above, I/O controller 1040 can interact with audio subsystem 1020 and/or display subsystem 1030. For example, input through a microphone or other audio device can provide input or commands for one or more applications or functions of computing device 1000. Additionally, audio output can be provided instead of, or in addition to, display output. In another example, if display subsystem 1030 includes a touch screen, the display device may also act as an input device, which can be at least partially managed by I/O controller 1040. There can also be additional buttons or switches on computing device 1000 to provide I/O functions managed by I/O controller 1040.

In some embodiments, I/O controller 1040 manages devices such as accelerometers, cameras, light sensors or other environmental sensors, or other hardware that can be included in computing device 1000. The input can be part of direct user interaction, and may provide environmental input to the system to influence its operations (such as filtering for noise, adjusting displays for brightness detection, applying a flash for a camera, or other features).

In some embodiments, computing device 1000 includes a power management component 1050 that manages battery power usage, charging of the battery, and features related to power saving operation.

A memory subsystem 1060 includes memory devices for storing information in computing device 1000. Memory subsystem 1060 can include nonvolatile memory devices (whose state does not change if power to the memory device is interrupted) and/or volatile memory devices (whose state is indeterminate if power to the memory device is interrupted). Memory subsystem 1060 can store application data, user data, music, photos, documents, or other data, as well as system data (whether long-term or temporary) related to the execution of the applications and functions of computing device 1000.

Some portion of memory subsystem 1060 may also be provided as a non-transitory machine-readable medium for storing the computer-executable instructions (e.g., instructions to implement any other processes discussed herein). The machine-readable medium may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, some embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

In some embodiments, computing device 1000 includes a network interface within a connectivity component 1070, such as a cellular interface 1072 or a wireless interface 1074, so that an embodiment of computing device 1000 may be incorporated into a wireless device such as a cellular phone or a personal digital assistant. In some embodiments, connectivity component 1070 includes hardware devices (e.g., wireless and/or wired connectors and communication hardware) and software components (e.g., drivers and/or protocol stacks) to enable computing device 1000 to communicate with external devices. Computing device 1000 could include separate devices, such as other computing devices, wireless access points or base stations, as well as peripherals such as headsets, printers, or other devices.

In some embodiments, connectivity component 1070 can include multiple different types of network interfaces, such as one or more wireless interfaces for allowing processor 1010 to communicate with another device. To generalize, computing device 1000 is illustrated with cellular interface 1072 and wireless interface 1074. Cellular interface 1072 refers generally to wireless interfaces to cellular networks provided by cellular network carriers, such as provided via GSM or variations or derivatives, CDMA (code division multiple access) or variations or derivatives, TDM (time division multiplexing) or variations or derivatives, or other cellular service standards. Wireless interface 1074 refers generally to non-cellular wireless interfaces, and can include personal area networks (such as Bluetooth, Near Field, etc.), local area networks (such as Wi-Fi), and/or wide area networks (such as WiMax), or other wireless communication.

In some embodiments, computing device 1000 has various peripheral connections 1080, which may include hardware interfaces and connectors, as well as software components (e.g., drivers and/or protocol stacks) to make peripheral connections. It will be understood that computing device 1000 could both be a peripheral device to other computing devices (via "to" 1082), as well as have peripheral devices connected to it (via "from" 1084). The computing device 1000 may have a "docking" connector to connect to other computing devices for purposes such as managing content on computing device 1000 (e.g., downloading and/or uploading, changing, synchronizing). Additionally, a docking connector can allow computing device 1000 to connect to certain peripherals that allow computing device 1000 to control content output, for example, to audiovisual or other systems.

In addition to a proprietary docking connector or other proprietary connection hardware, computing device 1000 can make peripheral connections 1080 via common or standards-based connectors. Common types of connectors can include a Universal Serial Bus (USB) connector (which can include any of a number of different hardware interfaces), a DisplayPort or MiniDisplayPort (MDP) connector, a High Definition Multimedia Interface (HDMI) connector, a Firewire connector, or other types of connectors.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. For example, other memory architectures e.g., Dynamic RAM (DRAM) may use the embodiments discussed. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

In one example, an apparatus is provided which may comprise: a memory request datapath operable to transmit a memory request; a first circuitry, a second circuitry, and a third circuitry. The first circuitry may be operable to identify any memory request having an address that is between any of one or more pairs of base-address and limit-address indicators. The second circuitry may be operable to transmit to a memory interface any memory request that is identified by the first circuitry, and to apply a default memory access protocol to any memory request that is unidentified by the first circuitry. The third circuitry may be operable to modify an address of a memory request when both a multiple-memory-interface indicator and an address-flattening indicator are asserted.

In some embodiments, the apparatus may comprise pairs of base-address and limit-address registers driving, respectively, the pairs of base-address and limit-address indicators. In some embodiments, at least one of the one or more pairs of base-address and limit-address indicators has a corresponding screen-enable register driving a screen-enable indicator. In some embodiments, the first circuitry may be operable to identify a memory request when the corresponding screen-enable indicator is asserted. In some embodiments, the apparatus may comprise a plurality of memory interfaces, wherein at least one memory interface of the plurality of memory interfaces has one or more of the pairs of base-address and limit-address indicators.

In some embodiments, the third circuitry may be operable to set address bits [M:6] of a memory request to the values of address bits $\{[M:Y],[(Y-2):6]\}$ if the memory request is identified by the first circuitry and both the multiple-memory interface indicator and the address-flattening indicator are asserted, and to set address bits [M:6] of the memory request to the values of address bits $\{[M-1:7]\}$ if the memory request is unidentified by the first circuitry and both the multiple-memory interface indicator and the address-flattening indicator are asserted, and to leave address bits [M:6] of the memory request unmodified if either the multiple-memory interface indicator or the address-flattening indicator is deasserted.

In some embodiments, the apparatus may comprise a first memory interface and a second memory interface. In some embodiments, the apparatus may comprise a fourth circuitry operable to select the second memory interface for a memory request on the memory request datapath based upon one of a striping protocol and a hashing protocol.

In another example, an apparatus is provided which may comprise a memory request datapath operable to transmit a memory request; a first memory interface; a second memory interface; a set of first memory interface logic devices; a set of second memory interface logic devices; a first set of logic devices; and a second set of logic devices. The set of first memory interface logic devices may include circuitry for one or more first screens, the circuitry for at least one first screen including a screen base address register operable to store a screen base address and a screen limit address register operable to store a screen limit address. The set of second memory interface logic devices may include circuitry for one or more second screens, the circuitry for at least one second screen including a screen base address register operable to store a screen base address and a screen limit address register operable to store a screen limit address. The first set of logic devices may be operable to identify any memory request having an address that is between either the screen base address and screen limit address for any of the first screens or between the screen base address and screen limit address for any of the second screens. The second set of logic devices may be operable to transmit to a memory interface any memory requests that are identified by the first set of logic devices, and to apply a default memory access protocol to any memory requests unidentified by the first set of logic devices.

In some embodiments, the circuitry for at least one first screen and the circuitry for at least one second screen may include a corresponding screen enable register operable to store a screen enable. In some embodiments, the first set of logic devices may be operable to identify any memory request when the corresponding screen enable is asserted. In some embodiments, the apparatus may comprise an address flattening enable register operable to store an address flattening enable, and a third set of logic devices operable to modify an address associated with any memory request when the address flattening enable is asserted.

In some embodiments, the third set of logic devices may be operable to set address bits [M:6] of a memory request to the values of address bits $\{[M:Y],[(Y-2):6]\}$ if the memory request is identified by the first set of logic devices and both a multiple-memory interface indicator and an address-flattening indicator are asserted, and to set address bits [M:6] of the memory request to the values of address bits $\{[M-1:7]\}$ if the memory request is unidentified by the first set of logic devices and both the multiple-memory interface indicator and the address-flattening indicator are asserted, and to leave address bits [M:6] of the memory request unmodified if either the multiple-memory interface indicator or the address-flattening indicator is deasserted.

In some embodiments, the apparatus may comprise a fourth set of logic devices operable to select the second memory interface for a memory request on the memory request datapath based on one of a striping protocol and a hashing protocol.

In another example, a system comprising a memory, a processor coupled to the memory, and a wireless interface for allowing the processor to communicate with another device is provided, the processor including any of the exemplary apparatus described above.

In another example, a system may comprise a memory, a processor coupled to the memory, and a wireless interface for allowing the processor to communicate with another device, the processor including: a memory request datapath operable to transmit memory requests, a first circuitry, and a second circuitry. The first circuitry may be operable to identify any memory request having an address that is between any of one or more pairs of base-address and limit-address indicators. The second circuitry may be operable to transmit to a memory interface any memory requests that are identified by the first circuitry, and to apply a default memory access protocol to any memory requests unidentified by the first circuitry. The third circuitry may be operable to modify an address of a memory request when both a multiple-memory-interface indicator and an address-flattening indicator are asserted.

In some embodiments, the system may comprise one or more pairs of base-address and limit-address registers driving, respectively, the pairs of base-address and limit-address indicators, wherein at least one of the one or more pairs of base-address and limit-address indicators has a corresponding screen-enable register driving a screen-enable indicator. In some embodiments, the first circuitry may be operable to identify any memory request when the corresponding screen-enable indicator is asserted. In some embodiments, the system may comprise a first memory interface and a second memory interface, wherein both the first memory interface and the second memory interface have one or more of the pairs of base-address and limit-address indicators.

In some embodiments, the third circuitry may be operable to set address bits [M:6] of a memory request to the values of address bits {[M:Y],[(Y−2):6]} if the memory request is identified by the first circuitry and both the multiple-memory interface indicator and the address-flattening indicator are asserted, and to set address bits [M:6] of the memory request to the values of address bits {[M−1:7]} if the memory request is unidentified by the first circuitry and both the multiple-memory interface indicator and the address-flattening indicator are asserted, and to leave address bits [M:6] of the memory request unmodified if either the multiple-memory interface indicator or the address-flattening indicator is deasserted.

In some embodiments, the system may comprise a fourth circuitry operable to select the second memory interface for a memory request on the memory request datapath based upon one of a striping protocol and a hashing protocol.

In another example, a method may comprise: identifying, with a set of logic devices, any memory request on a memory request datapath having an address that is between any of one or more pairs of base-address and limit-address indicators; transmitting to a memory interface any memory requests identified by the set of logic devices; applying a default memory access protocol to any memory requests unidentified by the set of logic devices; and modifying an address of a memory request when multiple memory interfaces are available while an address-flattening indicator is asserted.

In some embodiments, the method may comprise identifying, with the set of logic devices, a memory request when a corresponding screen-enable indicator is asserted. In some embodiments, the method may comprise modifying a memory request to set address bits [M:6] of the memory request to the values of address bits {[M:Y],[(Y−2):6]} if the memory request is identified by the set of logic devices and multiple memory interfaces are available and the address-flattening indicator is asserted, and to set address bits [M:6] of the memory request to the values of address bits {[M−1:7]} if the memory request is unidentified by the set of logic devices and multiple memory interfaces are available and the address-flattening indicator is asserted, and to leave address bits [M:6] of the memory request unmodified if either multiple memory interfaces are unavailable or the address-flattening indicator is deasserted.

In some embodiments, a first memory interface has one or more first pairs of base-address and limit-address indicators and a second memory interface has one or more second pairs of base-address and limit-address indicators. In some embodiments, the method may comprise selecting the second memory interface for a memory request on the memory request datapath based upon one of a striping protocol and a hashing protocol.

In another example, machine readable storage media is provided, the machine readable storage media having machine executable instructions stored thereon that, when executed, cause one or more processors to perform any of the exemplary methods discussed above.

In another example, machine readable storage media is provided, the machine readable storage media having machine executable instructions stored thereon that, when executed, cause one or more processors to perform an operation that may comprise: identifying, with a set of logic devices, any memory request on a memory request datapath having an address that is between any of one or more pairs of base-address and limit-address indicators; transmitting to a memory interface any memory requests identified by the set of logic devices; applying a default memory access protocol to any memory requests unidentified by the set of logic devices; and modifying an address of a memory request when multiple memory interfaces are available while an address-flattening indicator is asserted.

In some examples, the machine executable instructions, when executed, cause one or more processors to perform an operation that may comprise: identifying, with the set of logic devices, a memory request when a corresponding screen-enable indicator is asserted.

In some embodiments, the machine executable instructions, when executed, cause one or more processors to perform an operation that may comprise: modifying a memory request to set address bits [M:6] of the memory request to the values of address bits {[M:Y],[(Y−2):6]} if the memory request is identified by the set of logic devices and multiple memory interfaces are available and the address-flattening indicator is asserted, and to set address bits [M:6] of the memory request to the values of address bits {[M−1:7]} if the memory request is unidentified by the set of logic devices and multiple memory interfaces are available and the address-flattening indicator is asserted, and to leave address bits [M:6] of the memory request unmodified if either multiple memory interfaces are unavailable or the address-flattening indicator is deasserted.

In some examples, the first memory interface may have one or more first pairs of base-address and limit-address indicators and a second memory interface may have one or more second pairs of base-address and limit-address indicators. In some embodiments, the machine executable instructions, when executed, cause one or more processors to perform an operation that may comprise selecting the second memory interface for a memory request on the memory request datapath based upon one of a striping protocol and a hashing protocol.

In another example, an apparatus may comprise: means for identifying, with a set of logic devices, any memory request on a memory request datapath having an address that is between any of one or more pairs of base-address and limit-address indicators; means for transmitting to a memory interface any memory requests identified by the set of logic devices; means for applying a default memory access protocol to any memory requests unidentified by the set of logic devices; and means for modifying an address of a memory request when multiple memory interfaces are available while an address-flattening indicator is asserted.

In some embodiments, the apparatus may comprise means for identifying, with the set of logic devices, a memory request when a corresponding screen-enable indicator is asserted.

In some embodiments, the apparatus may comprise means for modifying a memory request to set address bits [M:6] of the memory request to the values of address bits {[M:Y], [(Y−2):6]} if the memory request is identified by the set of logic devices and multiple memory interfaces are available and the address-flattening indicator is asserted, and to set address bits [M:6] of the memory request to the values of address bits {[M−1:7]} if the memory request is unidentified by the set of logic devices and multiple memory interfaces are available and the address-flattening indicator is asserted, and to leave address bits [M:6] of the memory request unmodified if either multiple memory interfaces are unavailable or the address-flattening indicator is deasserted. In some embodiments, a first memory interface may have one or more first pairs of base-address and limit-address indicators and a second memory interface may have one or more second pairs of base-address and limit-address indicators.

In some embodiments, the apparatus may comprise means for selecting the second memory interface for a memory request on the memory request datapath based upon one of a striping protocol and a hashing protocol.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

I claim:

1. An apparatus comprising:
   a memory request datapath operable to transmit a memory request;
   a first circuitry operable to identify any memory request having an address that is between any of one or more pairs of first-address and second-address indicators;
   a second circuitry operable to transmit to a memory interface any memory request that is identified by the first circuitry, and to apply a default memory access protocol to any memory request that is unidentified by the first circuitry; and
   a third circuitry operable to modify an address of a memory request when both a multiple-memory-interface indicator and an address-flattening indicator are asserted.

2. The apparatus of claim 1, comprising pairs of first-address and second-address registers driving, respectively, the pairs of first-address and second-address indicators.

3. The apparatus of claim 1, wherein at least one of the one or more pairs of first-address and second-address indicators has a corresponding screen-enable register driving a screen-enable indicator.

4. The apparatus of claim 3, wherein the first circuitry is operable to identify a memory request when the corresponding screen-enable indicator is asserted.

5. The apparatus of claim 1, comprising a plurality of memory interfaces, wherein at least one memory interface of the plurality of memory interfaces has one or more of the pairs of first-address and second-address indicators.

6. The apparatus of claim 1, wherein the third circuitry is operable to route signal paths for address bits [M:6] of a memory request from signal paths for address bits {[M:Y], [(Y−2):6]} if the memory request is identified by the first circuitry and both the multiple-memory interface indicator and the address-flattening indicator are asserted, and to route signal paths for address bits [M:6] of the memory request from signal paths for address bits {[M−1:7]} if the memory request is unidentified by the first circuitry and both the multiple-memory interface indicator and the address-flattening indicator are asserted, wherein M and Y are numbers such that M>=Y>=8.

7. The apparatus of claim 1, comprising a first memory interface and a second memory interface.

8. The apparatus of claim 7, comprising a fourth circuitry operable to select the second memory interface for a memory request on the memory request datapath based upon one of a striping protocol and a hashing protocol.

9. An apparatus comprising:
   a memory request datapath operable to transmit a memory request;
   a first memory interface;
   a second memory interface;
   a set of first memory interface logic devices including circuitry for one or more first screens, the circuitry for at least one first screen including a screen base address register operable to store a screen base address and a screen limit address register operable to store a screen limit address;
   a set of second memory interface logic devices including circuitry for one or more second screens, the circuitry for at least one second screen including a screen base address register operable to store a screen base address and a screen limit address register operable to store a screen limit address;
   a first set of logic devices operable to identify any memory request having an address that is between either the screen base address and screen limit address for any of the first screens or between the screen base address and screen limit address for any of the second screens; and
   a second set of logic devices operable to transmit to a memory interface any memory requests that are identified by the first set of logic devices, and to apply a default memory access protocol to any memory requests unidentified by the first set of logic devices.

10. The apparatus of claim 9, wherein the circuitry for at least one first screen and the circuitry for at least one second screen includes a corresponding screen enable register operable to store a screen enable.

11. The apparatus of claim 10, wherein the first set of logic devices is operable to identify any memory request when the corresponding screen enable is asserted.

12. The apparatus of claim 9, comprising:
    an address flattening enable register operable to store an address flattening enable; and
    a third set of logic devices operable to modify an address associated with any memory request when the address flattening enable is asserted.

13. The apparatus of claim 12, wherein the third set of logic devices is operable to route signal paths for address bits [M:6] of a memory request from signal paths for address bits {[M:Y],[(Y−2):6]} if the memory request is identified by the first set of logic devices and both a multiple-memory interface indicator and an address-flattening indicator are asserted, and to route signal paths for address bits [M:6] of the memory request from signal paths for address bits {[M−1:7]} if the memory request is unidentified by the first set of logic devices and both the multiple-memory interface indicator and the address-flattening indicator are asserted, wherein M and Y are numbers such that M>=Y>=8.

14. The apparatus of claim 12, comprising a fourth set of logic devices operable to select the second memory interface for a memory request on the memory request datapath based on one of a striping protocol and a hashing protocol.

15. A system comprising:
a memory,
a processor coupled to the memory, and
a wireless interface for allowing the processor to communicate with another device, the processor including:
  a memory request datapath operable to transmit memory requests;
  a first circuitry operable to identify any memory request having an address that is between any of one or more pairs of first-address and second-address indicators;
  a second circuitry operable to transmit to a memory interface any memory requests that are identified by the first circuitry, and to apply a default memory access protocol to any memory requests unidentified by the first circuitry; and
  a third circuitry operable to modify an address of a memory request when both a multiple-memory-interface indicator and an address-flattening indicator are asserted.

16. The system of claim 15, comprising one or more pairs of first-address and second-address registers driving, respectively, the pairs of first-address and second-address indicators, wherein at least one of the one or more pairs of first-address and second-address indicators has a corresponding screen-enable register driving a screen-enable indicator.

17. The system of claim 16, wherein the first circuitry is operable to identify any memory request when the corresponding screen-enable indicator is asserted.

18. The system of claim 15, comprising a first memory interface and a second memory interface, wherein both the first memory interface and the second memory interface have one or more of the pairs of first-address and second-address indicators.

19. The system of claim 15, wherein the third circuitry is operable to route signal paths for address bits [M:6] of a memory request from signal paths for address bits {[M:Y], [(Y−2):6]} if the memory request is identified by the first circuitry and both the multiple-memory interface indicator and the address-flattening indicator are asserted, and to route signal paths for address bits [M:6] of the memory request from signal paths for address bits {[M−1:7]} if the memory request is unidentified by the first circuitry and both the multiple-memory interface indicator and the address-flattening indicator are asserted, wherein M and Y are numbers such that M>=Y>=8.

20. The system of claim 15, comprising a fourth circuitry operable to select the second memory interface for a memory request on the memory request datapath based upon one of a striping protocol and a hashing protocol.

* * * * *